US012635610B2

(12) United States Patent
White et al.

(10) Patent No.: US 12,635,610 B2
(45) Date of Patent: May 26, 2026

(54) AGRICULTURAL HEADER WITH INTER-FRAME FLEXIBLE SEAL

(71) Applicant: DEERE & COMPANY, Moline, IL (US)

(72) Inventors: Matthew R. White, Geneseo, IL (US); Duane M. Bomleny, Geneseo, IL (US); Bryan R. Yanke, Eldridge, IA (US); Justin C. Freehill, Fenton, IL (US)

(73) Assignee: Deere & Company, Moline, IL (US)

( * ) Notice: Subject to any disclaimer, the term of this patent is extended or adjusted under 35 U.S.C. 154(b) by 1030 days.

(21) Appl. No.: 17/727,942

(22) Filed: Apr. 25, 2022

(65) Prior Publication Data

US 2022/0240449 A1 Aug. 4, 2022

Related U.S. Application Data

(63) Continuation of application No. PCT/US2020/040048, filed on Jun. 29, 2020.

(Continued)

(51) Int. Cl.
*A01D 67/00* (2006.01)
*A01D 41/14* (2006.01)
(Continued)

(52) U.S. Cl.
CPC ......... *A01D 67/005* (2013.01); *A01D 41/141* (2013.01); *A01D 61/002* (2013.01);
(Continued)

(58) Field of Classification Search
CPC .... A01D 67/005; A01D 67/00; A01D 61/002; A01D 61/008; A01D 61/02; A01D 41/141
(Continued)

(56) References Cited

U.S. PATENT DOCUMENTS 4,956,966 A * 9/1990 Patterson ............... A01D 41/14
56/181
7,958,711 B1 * 6/2011 Sauerwein ............. A01D 57/20
56/181

(Continued)

FOREIGN PATENT DOCUMENTS

AU 673949 B2 * 11/1996 ............. A01D 57/20
CA 2554689 A1 * 1/2008 ............. A01D 57/20

(Continued)

OTHER PUBLICATIONS

"What are Elastomers?", 2025, https://byjus.com/physics/elastomers/ (Year: 2025).*

(Continued)

*Primary Examiner* — Joseph M Rocca
*Assistant Examiner* — Sunny D Webb
(74) *Attorney, Agent, or Firm* — Taft Stettinius & Hollister LLP; Stephen F. Rost

(57) ABSTRACT

An agricultural header comprises a first frame, a second frame, an endless side draper belt supported by the first frame, an endless center draper belt positioned in register with the side draper belt to receive cut crop laterally therefrom, an inter-frame flexible seal coupled to the first frame and the second frame. The first frame is coupled for movement relative to the second frame. The flexible seal underlies the side draper belt to receive cut crop that falls from the side draper belt and is arranged relative to the center draper belt to guide fallen crop toward the center draper belt. The flexible seal is configured to flex to accommodate movement of the first frame relative to the second frame.

19 Claims, 10 Drawing Sheets

Related U.S. Application Data

(60) Provisional application No. 62/928,581, filed on Oct. 31, 2019.

(51) Int. Cl.

| | |
|---|---|
| *A01D 61/00* | (2006.01) |
| *A01D 61/02* | (2006.01) |
| *F16J 15/3284* | (2016.01) |

(52) U.S. Cl.
CPC ........... *A01D 61/008* (2013.01); *A01D 61/02* (2013.01); *A01D 67/00* (2013.01); *F16J 15/3284* (2013.01)

(58) Field of Classification Search
USPC ............ 56/181, 16.6, 208, 153, 192; 460/70
See application file for complete search history.

(56) References Cited

U.S. PATENT DOCUMENTS

| | | | | |
|---|---|---|---|---|
| 8,544,250 | B2 | 10/2013 | Lovett et al. | |
| 9,161,492 | B2 * | 10/2015 | Fuechtling | A01D 41/14 |
| 10,285,331 | B2 | 5/2019 | Leys et al. | |
| 10,412,887 | B2 | 9/2019 | Fuchtling et al. | |
| 2002/0129591 | A1 * | 9/2002 | Patterson | A01D 61/02 56/158 |
| 2006/0254241 | A1 * | 11/2006 | Kempf | A01D 57/20 56/16.6 |
| 2009/0277147 | A1 | 11/2009 | Honas et al. | |
| 2011/0094201 | A1 | 4/2011 | Bomleny et al. | |
| 2014/0053525 | A1 * | 2/2014 | Borkgren | A01D 61/02 56/181 |
| 2014/0165526 | A1 | 6/2014 | Leys et al. | |
| 2018/0139898 | A1 | 5/2018 | Shearer | |
| 2019/0000014 | A1 | 1/2019 | Farley et al. | |
| 2019/0029177 | A1 * | 1/2019 | Enns | A01D 41/14 |

FOREIGN PATENT DOCUMENTS

| | | | | |
|---|---|---|---|---|
| EP | 0827684 | A2 | 3/1998 | |
| EP | 1685756 | A1 | 8/2006 | |
| EP | 2786650 | A1 * | 10/2014 | ............ A01D 57/20 |
| EP | 3278653 | A1 | 2/2018 | |
| EP | 3434095 | A1 | 1/2019 | |
| IN | 202021036612 | | 8/2020 | |
| WO | 02/102138 | A1 | 12/2002 | |
| WO | 2009136274 | A1 | 11/2009 | |
| WO | WO-2014032178 | A1 * | 3/2014 | ............ A01D 41/14 |

OTHER PUBLICATIONS

"Intermolecular assocaition: thermoplastic elstomers", Aug. 7, 2019, https://www.britannica.com/science/elastomer/Intermolecular-association-thermoplastic-elastomers (Year: 2019).*

International Search Report & Written Opinion, U.S. Patent Office, International Patent Application PCT/US2020/040048, 7 pages, published Sep. 30, 2020.

Combine Draper Header; Website: https://www.agriculture.com/machinery/harvest-equipment/combines/combine-header-pays-off_204-ar28874; Published Jan. 11, 2013-11.

European Patent Office, Munich; European Search Report for corresponding application EP19178317.4; pp. 7; Date Feb. 10, 2020.

John Deere; "Draper Center Feed Section Flexible Seal"; Matthew R. White, et al.; Date: Aug. 23, 2019; pp. 9.

Canola Seal Kit, BXE 10959, John Deere, Installation Instructions, Sep. 1, 2017, 12 pages.

S-Series Combine and Front End Equipment Optimization, "Ready to Harvest" for Canola, Jun. 5, 2018, 17 pages.

MacDon Float Module—Side Fillers, publicly available as early as Sep. 4, 2019, 1 page.

* cited by examiner

AGRICULTURAL HEADER WITH INTER-FRAME FLEXIBLE SEAL

CROSS-REFERENCE TO RELATED APPLICATION

The present application is a continuation of International Patent Application PCT/US2020/040048, filed Jun. 29, 2020, which claims the benefit of U.S. Provisional Application Ser. No. 62/928,581, filed Oct. 31, 2019, the disclosures of which are hereby incorporated by reference in their entirety.

FIELD OF THE DISCLOSURE

The present disclosure relates to an agricultural header for use with an agricultural harvester.

BACKGROUND OF THE DISCLOSURE

Agricultural headers are used with agricultural harvesters to harvest a crop. In one type of agricultural header, the agricultural header has a center section and two side sections (wings) coupled to the center section. The center section has a center draper belt, and the side sections each have a side draper belt. The belts receive crop cut by a cutter bar ahead of the belts relative to the direction of travel of the header. The side draper belts convey crop laterally toward the center draper belt. The center draper belt receives cut crop from the side draper belts and convey cut crop rearwardly toward the feederhouse of the agricultural harvester opposite to the direction of travel.

SUMMARY OF THE DISCLOSURE

According to an aspect of the present disclosure, there is disclosed an agricultural header for use with an agricultural harvester. The agricultural header is configured to cut crop when the agricultural harvester moves in a direction of travel. The agricultural header comprises a first frame, a second frame, an endless side draper belt positioned to receive crop cut by the agricultural header and advance cut crop laterally relative to the direction of travel, an endless center draper belt supported by the second frame and positioned in register with the side draper belt to receive cut crop laterally therefrom, and an inter-frame flexible seal coupled to the first frame and the second frame. The first frame is coupled for movement relative to the second frame. The first frame at least partially underlies the side draper belt. The flexible seal underlies the side draper belt to receive cut crop that falls from the side draper belt and is arranged relative to the center draper belt to guide fallen crop toward the center draper belt. The flexible seal is configured to flex to accommodate movement of the first frame relative to the second frame.

According to another aspect of the present disclosure, there is disclosed an agricultural header for use with an agricultural harvester. The agricultural header is configured to cut crop when the agricultural harvester moves in a direction of travel. The agricultural header comprises a side frame, an endless side draper belt supported by the side frame and positioned to receive crop cut by the agricultural header and advance cut crop laterally relative to the direction of travel, a center main frame to which the side frame is coupled, a center support frame, and an endless center draper belt supported by the center support frame and positioned in register with the side draper belt to receive cut crop laterally therefrom and advance cut crop rearwardly toward the agricultural harvester opposite to the direction of travel. The center main frame is coupled to the center support frame for movement relative thereto. The header comprises an inter-frame flexible seal coupled to the center main frame and the center support frame. The flexible seal underlies the side draper belt to receive cut crop that falls from the side draper belt and is arranged relative to the center draper belt to guide fallen crop toward the center draper belt. The flexible seal is configured to flex to accommodate movement of the center main frame relative to the center support frame.

According to another aspect of the present disclosure, there is disclosed an agricultural header for use with an agricultural harvester. The agricultural header is configured to cut crop when the agricultural harvester moves in a direction of travel. The agricultural header comprises a header main frame, a cutter bar, a center draper frame coupled pivotally to the header main frame and coupled to the cutter bar, a float arm coupled pivotally to the header main frame and coupled to the cutter bar such that the float arm is movable relative to the center draper frame, an endless side draper belt under which the float arm extends and that is positioned to receive crop cut by the agricultural header and advance cut crop laterally relative to the direction of travel, an endless center draper belt supported by the center draper frame and positioned in register with the side draper belt to receive cut crop laterally therefrom and advance cut crop rearwardly toward the agricultural harvester opposite to the direction of travel, and an inter-frame flexible seal coupled to the float arm and the center draper frame. The flexible seal underlies the side draper belt to receive cut crop that falls from the side draper belt and is arranged relative to the center draper belt to guide fallen crop toward the center draper belt. The flexible seal is configured to flex to accommodate movement of the float arm relative to the center draper frame.

The above and other features will become apparent from the following description and accompanying drawings.

BRIEF DESCRIPTION OF THE DRAWINGS

The detailed description of the drawings refers to the accompanying figures in which.

DETAILED DESCRIPTION OF THE DRAWINGS

Figure 1:
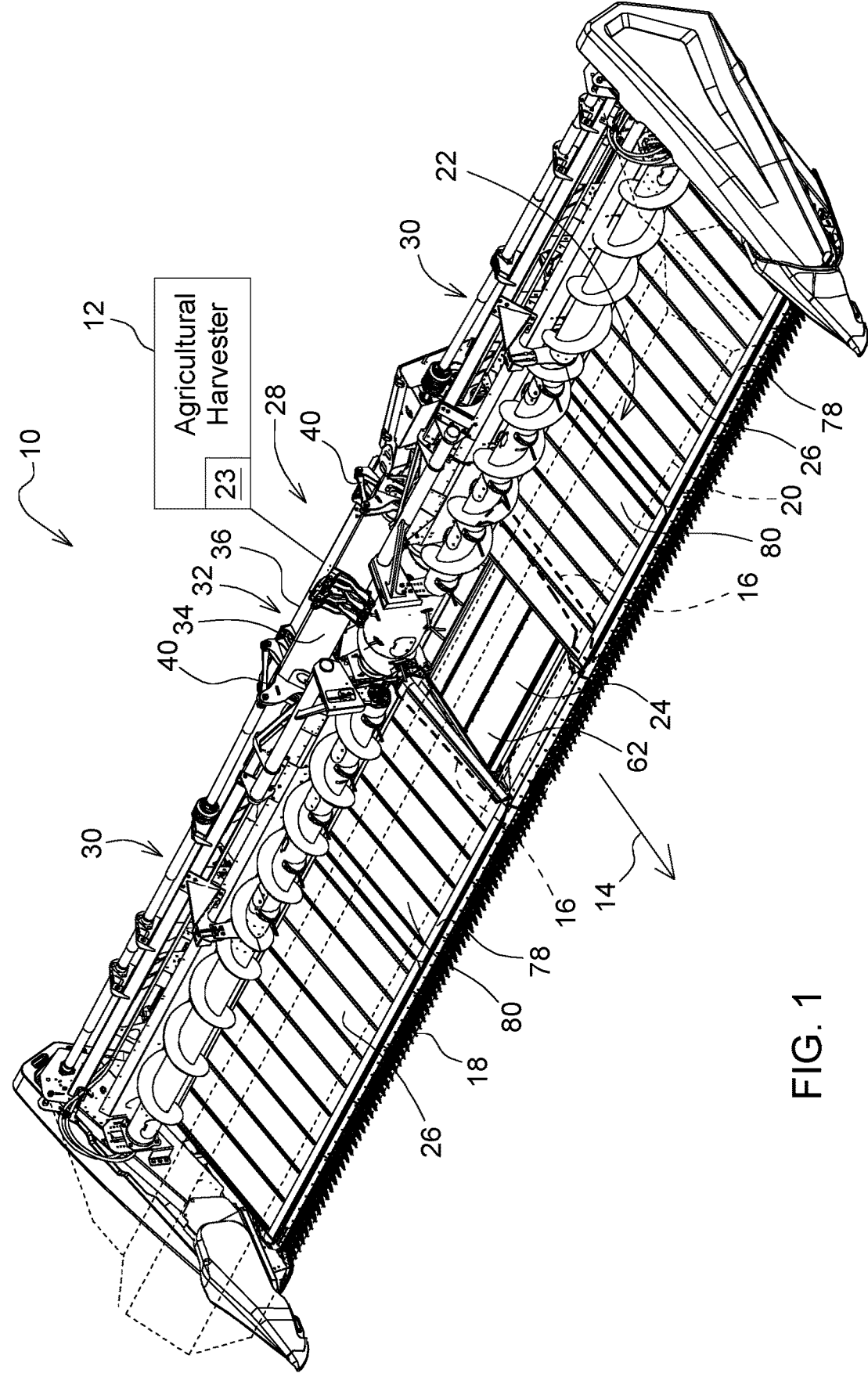
FIG. 1 is a perspective view showing an agricultural header having a center draper belt and two side draper belts that convey cut crop laterally relative to a direction of travel toward the center draper belt for transport to the feederhouse of an agricultural harvester (shown diagrammatically)
Figure 2:
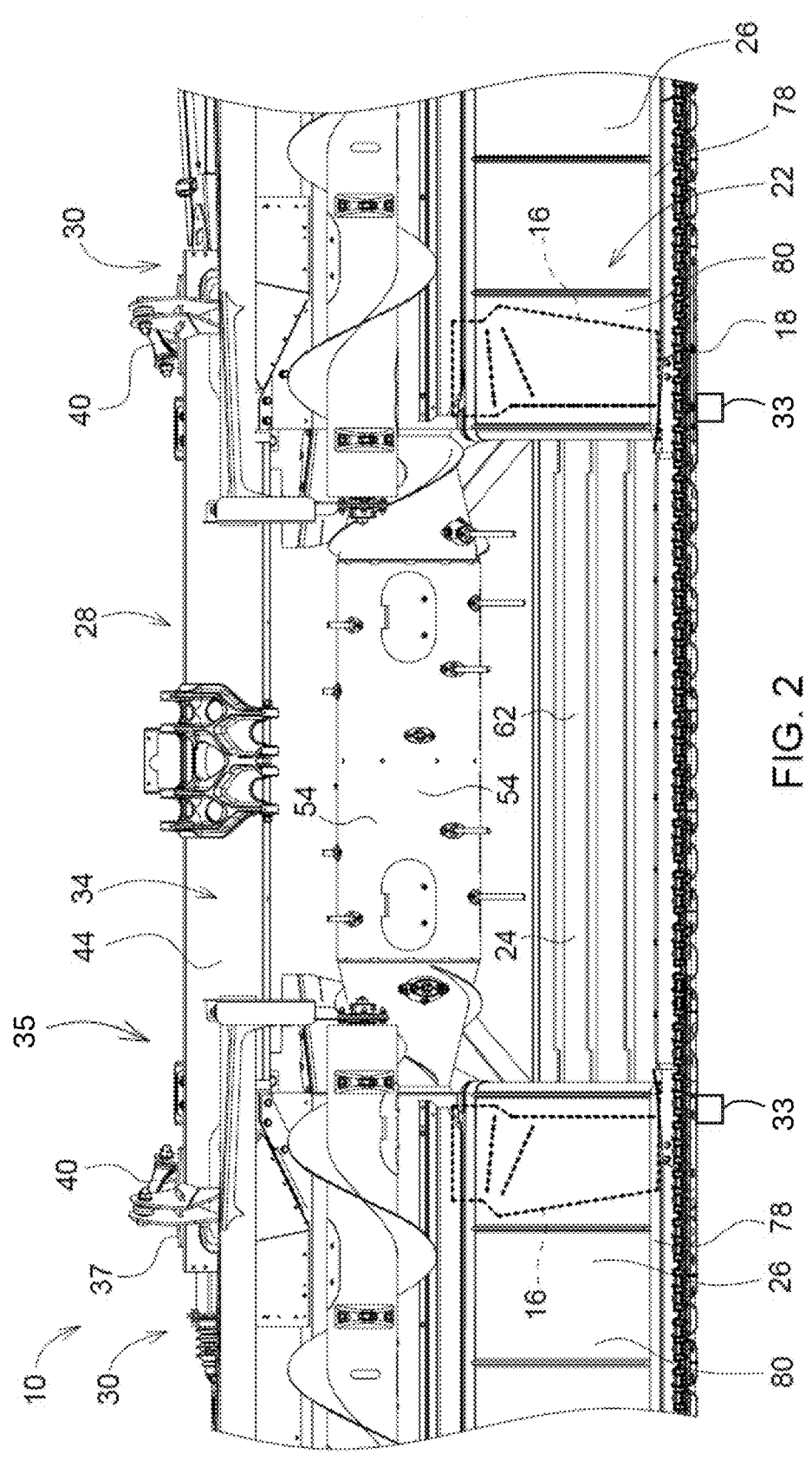
FIG. 2 is a front elevational view, with portions broken away, showing the agricultural header which includes a flexible seal positioned on either side of the center draper belt and underlying the respective side draper belt to reclaim cut crop that may inadvertently fall therefrom.
Figure 3:
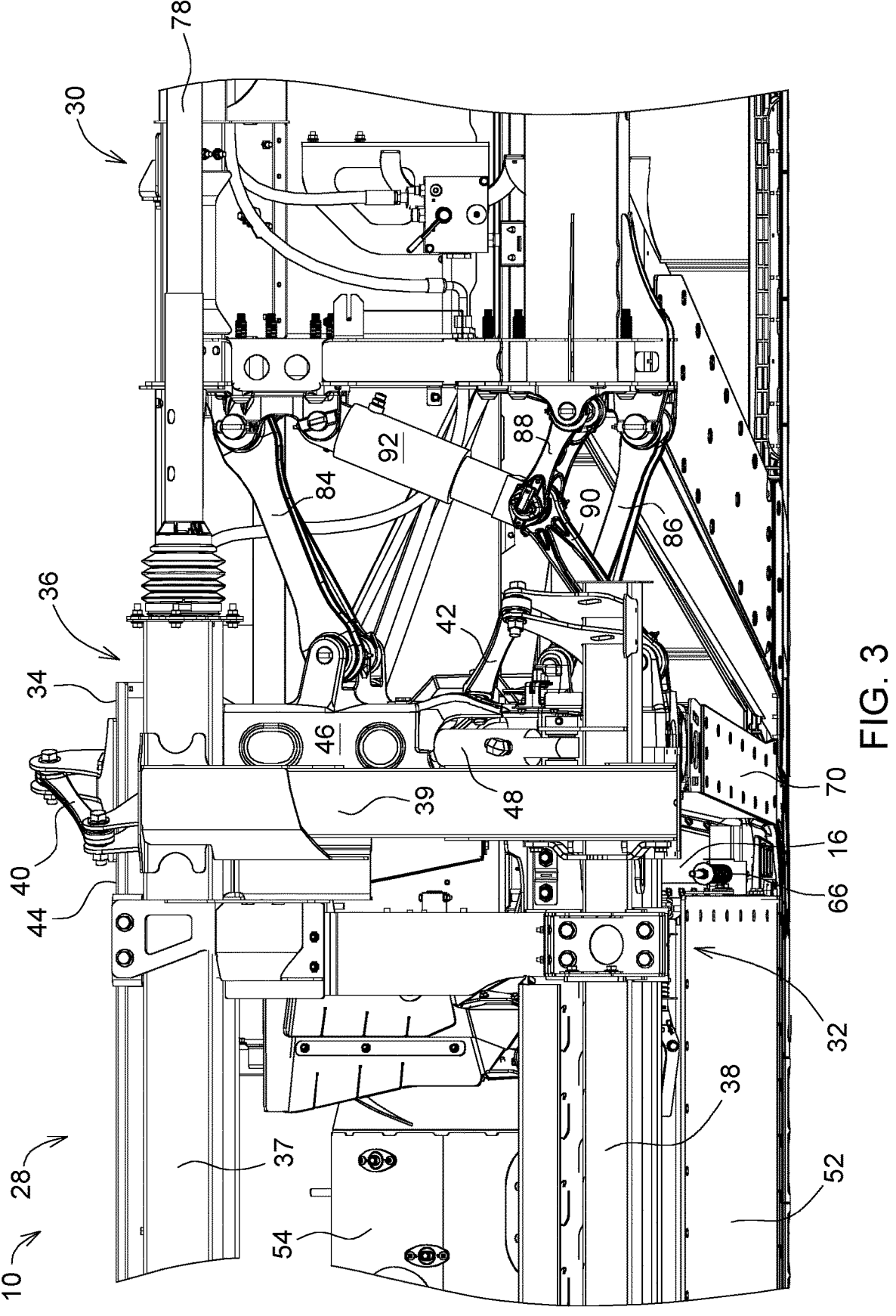
FIG. 3 is a rear elevational view showing coupling of a side section of the agricultural header to a center section of the header, and showing coupling of a center main frame of the center section to an attachment frame of a center support frame of the center section.

Referring to FIGS. 1-3, an agricultural header 10 is provided for use with an agricultural harvester 12 shown diagrammatically (e.g., a combine harvester). The agricultural header 10 is configured to cut crop when the agricultural harvester 12 moves in a direction of travel 14 over a field. The agricultural header 10 has a pair of flexible seals 16 positioned to reclaim cut crop that might otherwise have been lost.

The header 10 includes a laterally-extending cutter bar 18 configured to cut crop. The cutter bar 18 has a reciprocating knife that severs the stalk of the crop. A reel 20 of the header 10 moves the cut crop rearwardly, opposite to the direction of travel 14, onto a conveyor system 22 of the header 10 behind the cutter bar 18.

The conveyor system 22 transports the cut crop to a feederhouse 23 of the harvester 12 (feederhouse 23 shown diagrammatically) for intake into the harvester 12 and processing thereby. The conveyor system 22 includes a center conveyor 24 and two side conveyors 26. Each of the conveyors 24, 26 receives cut crop directly from the cutter bar 18. The side conveyors [24] 26 transport the cut crop laterally inwardly to the center conveyor 26. The center conveyor 24 receives cut crop from the side conveyors 26, and transports cut crop received from the side conveyors and from the cutter bar 18 rearwardly to the feederhouse 23 for intake into the harvester 12.

The header 10 includes a center section 28 and two side sections 30 (left and right) positioned on and coupled to laterally opposite sides of the center section 28. The center section 28 includes the center conveyor 24, and each side section 30 includes a respective one of the side conveyors 24. The description herein of one side section 30 applies to the other side section 30.

The center section 24 is supported by and in communication with the feederhouse 23. The center section 24 includes a center support frame 32 coupled to the feederhouse 23 in fixed relation thereto and a center main frame 34 coupled to the center support frame 32 for movement relative thereto. The center support frame 32 includes an attachment frame 36 coupled to the feederhouse 23 in fixed relation thereto.

The center main frame 34 is coupled to the attachment frame 36 via a four-bar linkage of the header 10 for movement relative to the attachment frame 36 in response to changes in the terrain. The four-bar linkage includes two upper links 40 and two lower links 42 (left lower link 42 not shown but similar to right lower link 42). The upper and lower links 40, 42 are coupled to the center main frame 34 and the attachment frame 36 so as to interconnect the frames 34, 36. The center main frame 34 includes an upper lateral member 44, a lower lateral member 45, a first (right) upright side member 46, and a second (left) upright side member 46, the upper and lower lateral members 44, 45 coupled fixedly (e.g., welded) to the upright side members 46. The attachment frame 36 includes an upper lateral member 37, a lower lateral member 38, a first (right) upright side member 39, and a second (left) upright side member 39 (not shown but similar to first upright side member 39), the upper and lower lateral members coupled fixedly (e.g., welded) to the upright side members. The upper links 40 are coupled pivotally to the upper lateral members 37, 44 of the attachment frame 36 and the center main frame 34. The lower links 42 are coupled pivotally to the lower lateral member 38 of the attachment frame 36 and coupled pivotally respectively to the first and second upright side members 46 of the center main frame 34. The center main frame 34 is an example of a first frame of the agricultural header 10.

The center main frame 34 is coupled to the attachment frame 36 via a first (right) and a second (left) hydraulic cylinder 48 of the header 10 (second hydraulic cylinder 48 not shown but similar to first cylinder 48) (FIG. 3). Pressure in the two cylinders 48 is regulated to establish a desired terrain-following capacity. The first cylinder 48 is coupled pivotally to the lower lateral member 38 of the attachment frame 36 and the first upright side member 46 of the center main frame 34, and the second cylinder 48 is coupled pivotally to the lower lateral member 38 of the attachment frame 36 and the second upright side member 46 of the center main frame 34.

Figure 4:
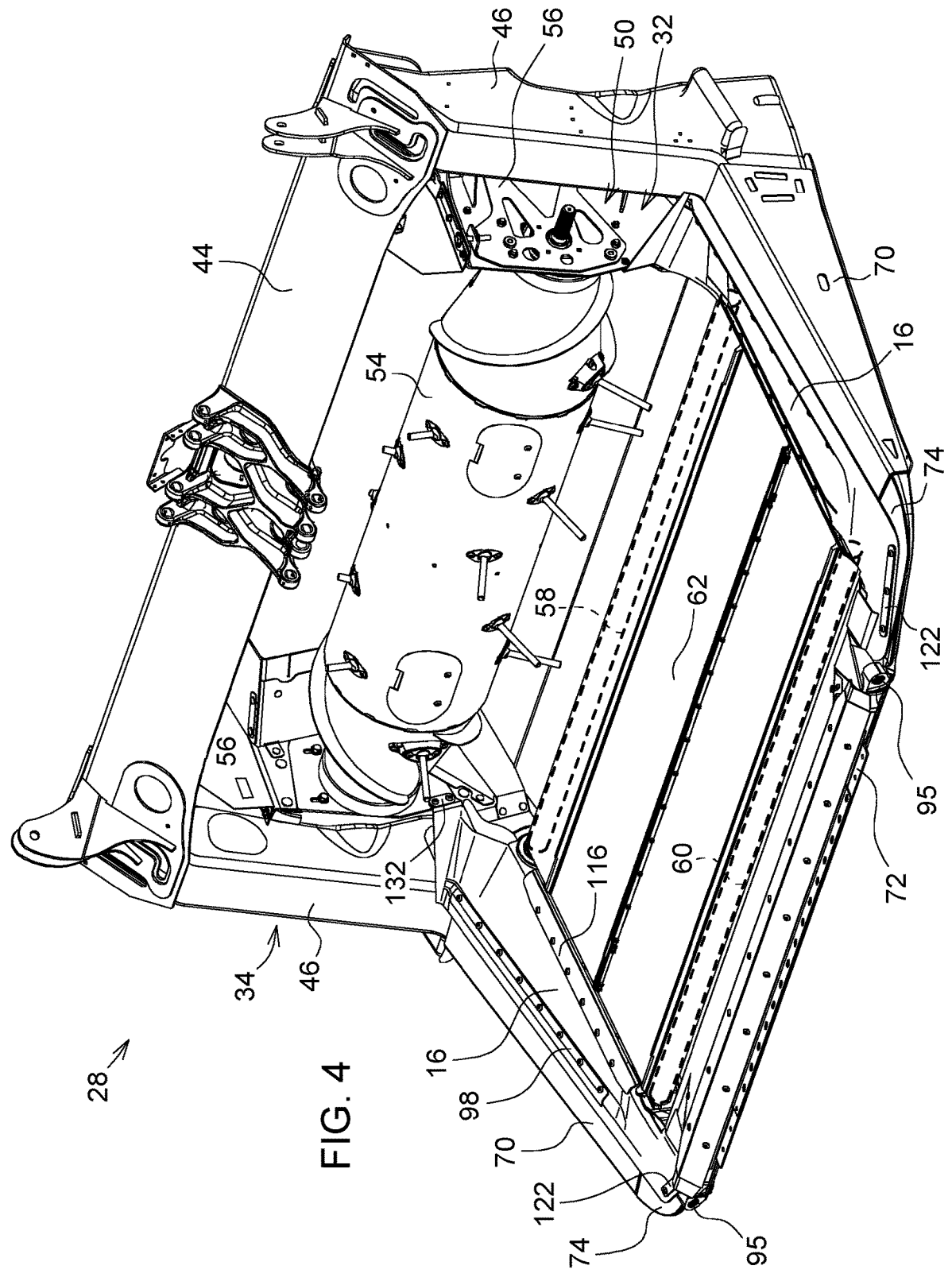
FIG. 4 is a perspective view showing a portion of the center section including the flexible seals positioned on either side of the center draper belt and coupled to the center main frame and a center tension frame of the center support frame.
Figure 5:
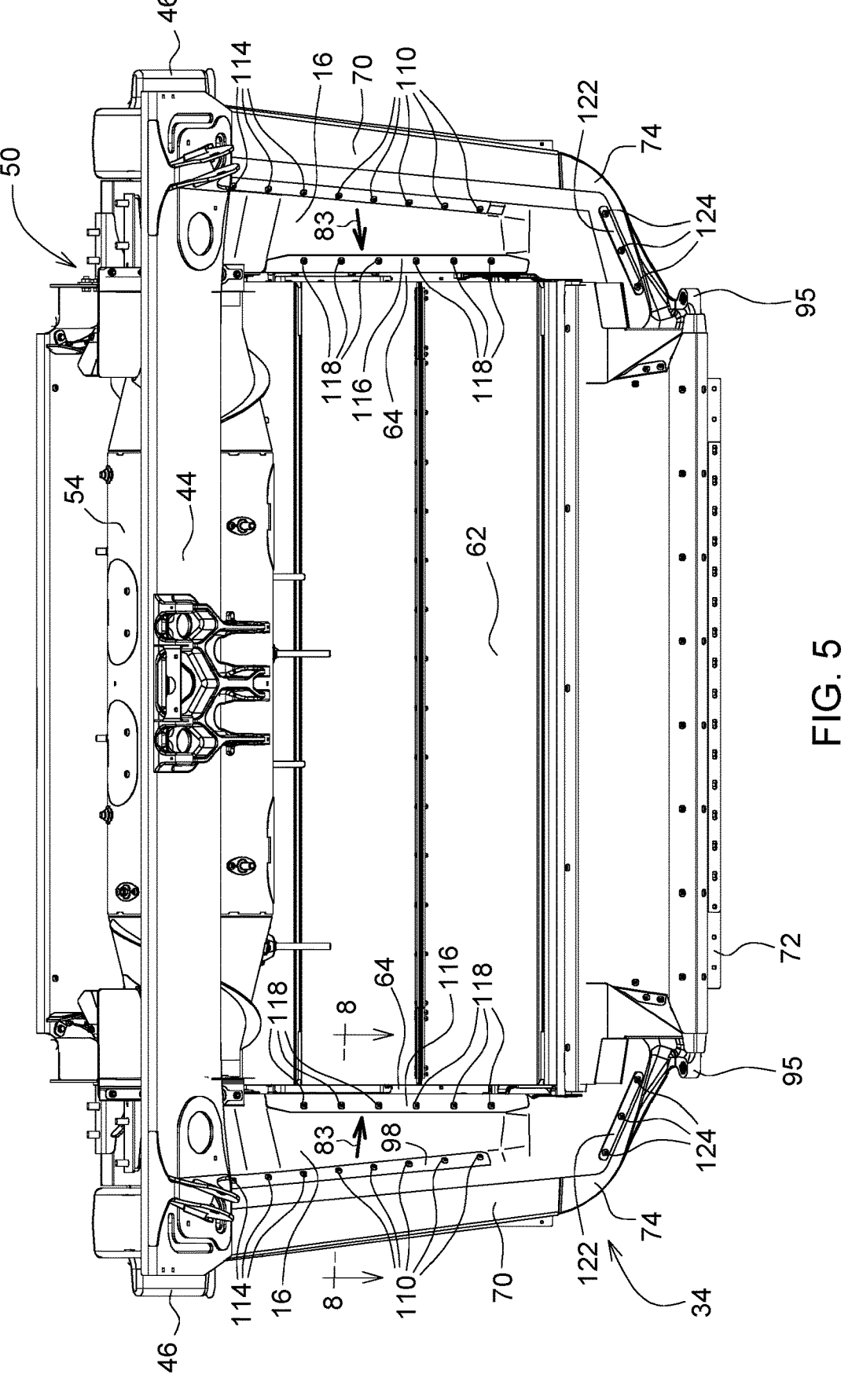
FIG. 5 is a top plan view showing the center section portion with the flexible seals positioned on either side of the center draper belt and coupled to the center main frame and the center tension frame.
Figure 6:
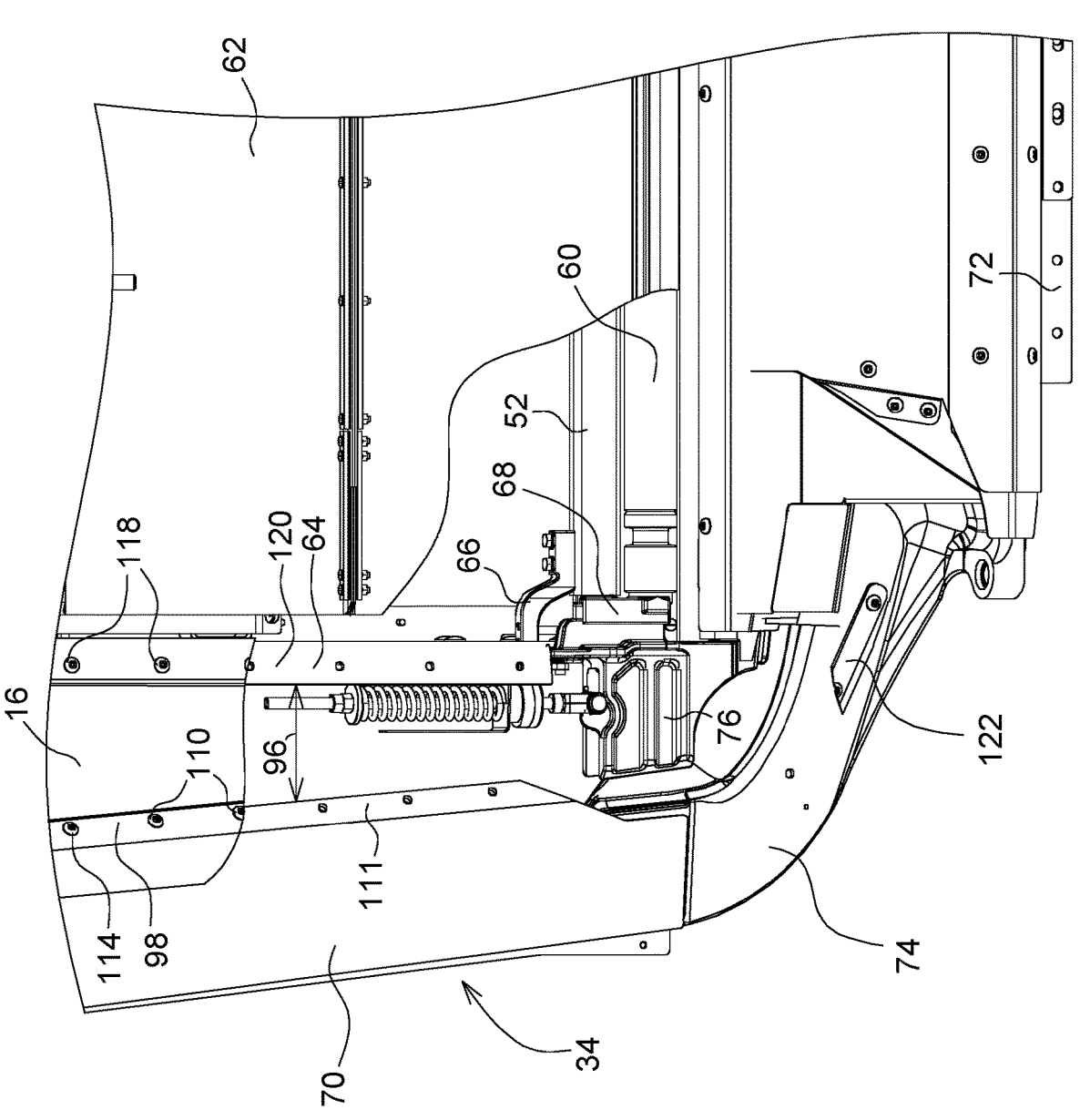
FIG. 6 is a top plan view, with portions broken away, showing a belt tensioner for tensioning the center draper belt, and a puck-and-clevis joint for interconnecting the center main frame and the center tension frame.

Referring to FIGS. 4 and 5, the center support frame 32 includes a feed frame 50 and a center tension frame 52 (which may also be called a center belt frame or a center draper frame). The center tension frame 52 is an example of a second frame of the agricultural header 10. The feed frame 50 is positioned between, and coupled fixedly to (e.g., bolted), the attachment frame 36 and the center tension frame 52 relative to a fore-aft dimension parallel to the direction of travel 14. Alternatively, the center tension frame 52 may be coupled pivotally to the feed frame 50. A drum 54 of the header 10 is coupled rotatably to, and positioned between, first (right) and second (left) side walls 56 of the feed frame 50. The drum 54 has tines about its periphery and is driven by a motor to advance cut crop toward the intake of the feederhouse 23.

The center conveyor 24 is supported by the center tension frame 52. The center conveyor 24 includes a rear drive roller 58 operable in rotation by a motor, a front idler roller 60, and an endless center draper belt 62 entrained about the rollers 58, 60. The rear drive roller 58 and the front idler roller 60 are coupled rotatably to, and positioned between, first (right) and second (left) fore-aft side members 64 of the center tension frame 52. The first and second fore-aft side members 64 are coupled fixedly (e.g., bolted) respectively to the first and second side walls 56 of the feed frame 50. The center draper belt 62 can thus be supported by the center support frame 32.

Referring to FIGS. 6-9, the front idler roller 60 is urged forwardly by a tensioner 66 of the center conveyor 24 to tension the center draper belt 62. The front idler roller 60 is coupled to the first and second fore-aft side members 64 with a puck-and-clevis joint 68 at each end of the roller 60. The pucks of the joints 68 are integrated respectively into the first and second fore-aft side members 64. The clevises of the joints 68 are supported respectively on the pucks of the tensioner 66. The ends of the front idler roller 60 are coupled respectively to the clevises of the joints 68. A bar of the tensioner 66 largely spans the gap between the side members 64 and has its ends also coupled respectively to the clevises of the joints 68. On each side of the center tension frame 52, the tensioner 66 has a post mounted to the respective side member 64, a spring surrounding the post, and an arm biased forwardly by the spring and extending through the side member 64 to the bar of the tensioner 66 to urge the roller 60 forwardly so as to tension the center draper belt 62.

Figure 7:
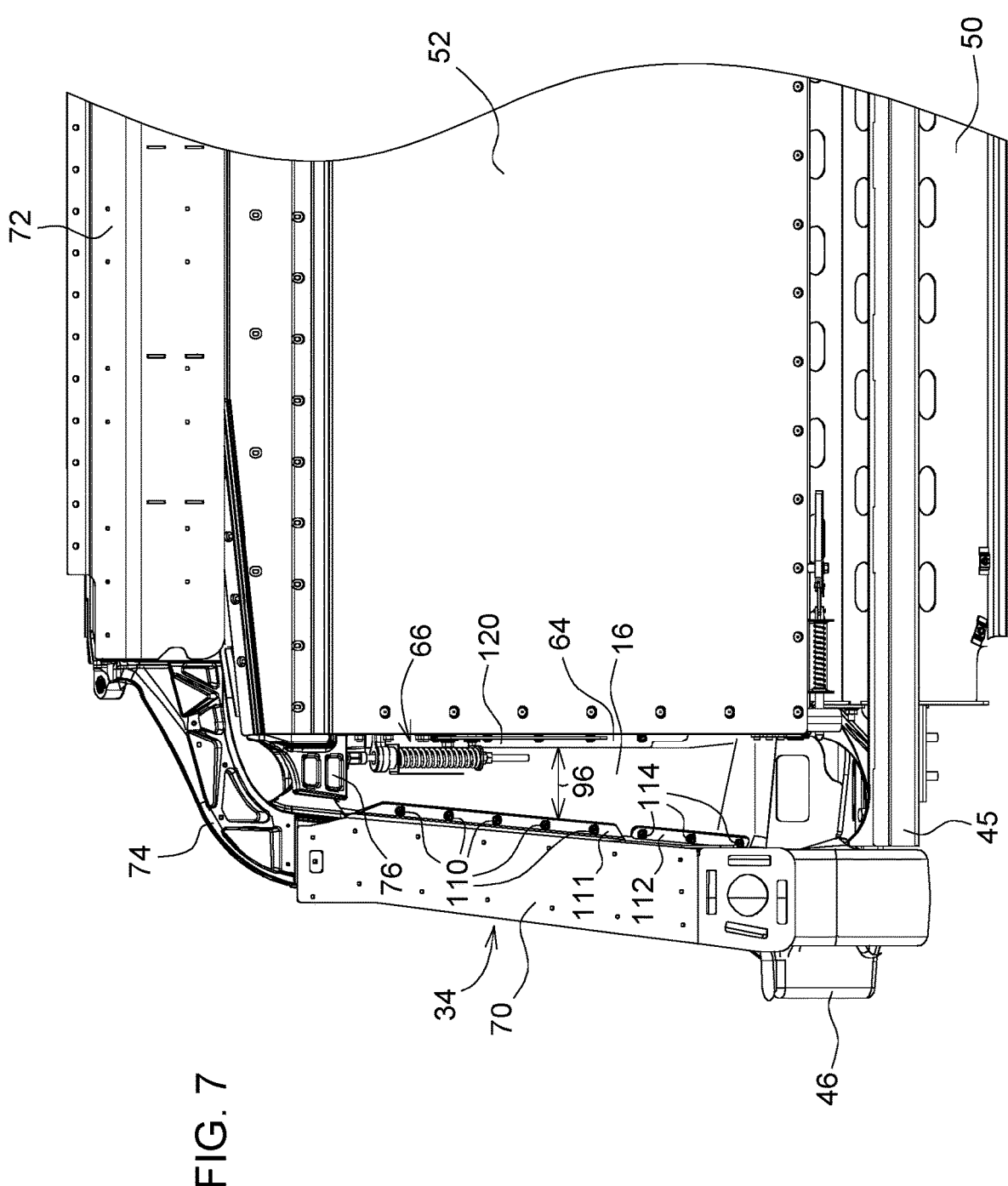
FIG. 7 is a bottom view showing mounting of a first of the flexible seals to the center main frame and the center tension frame.
Figure 8:
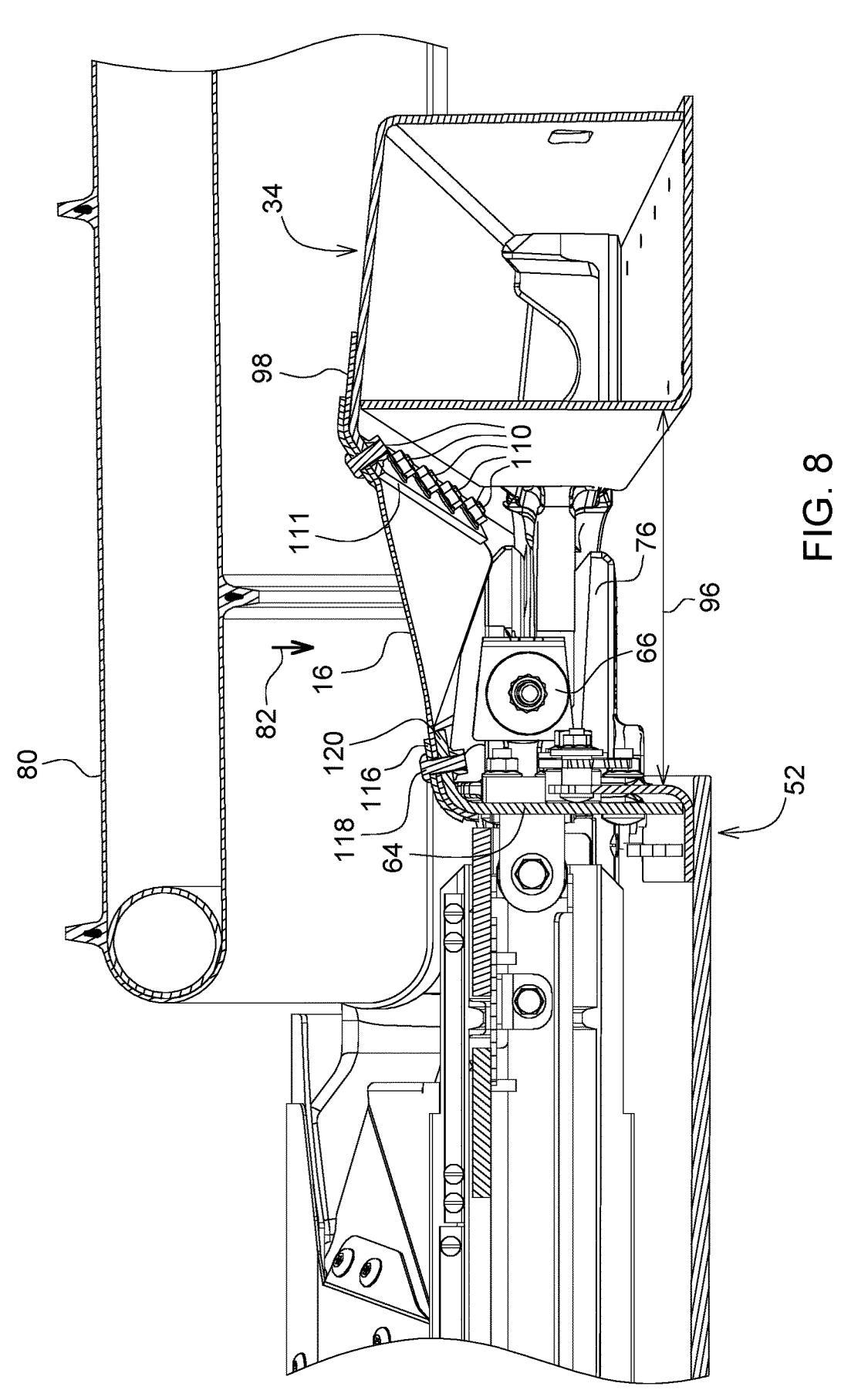
FIG. 8 is a sectional view taken along lines 8-8 of FIG. 5.
Figure 9:
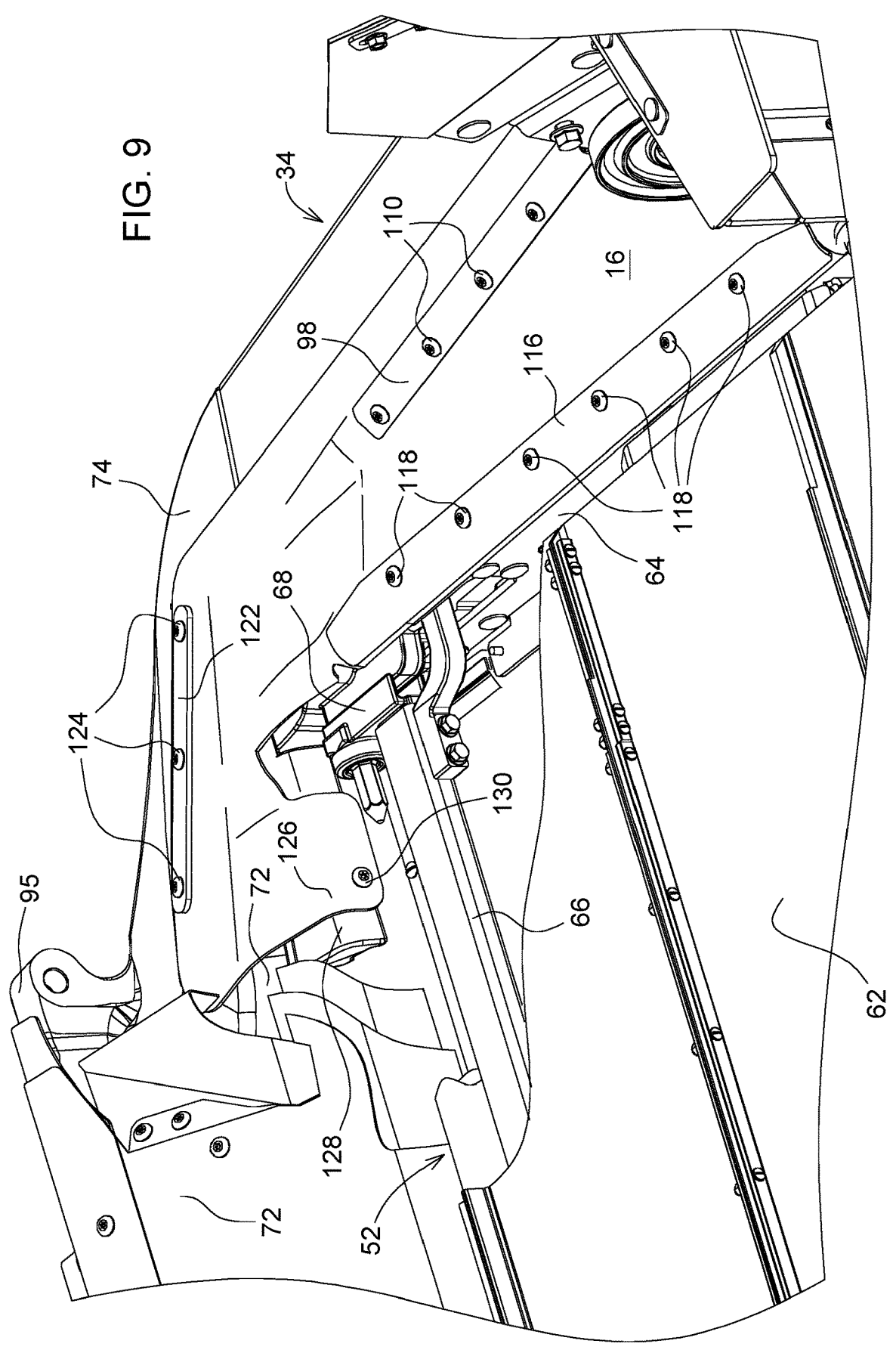
FIG. 9 is a perspective view, with portions broken away, showing coupling of a tang of the first flexible seal to a front frame portion of the center tension frame.
Figure 10:
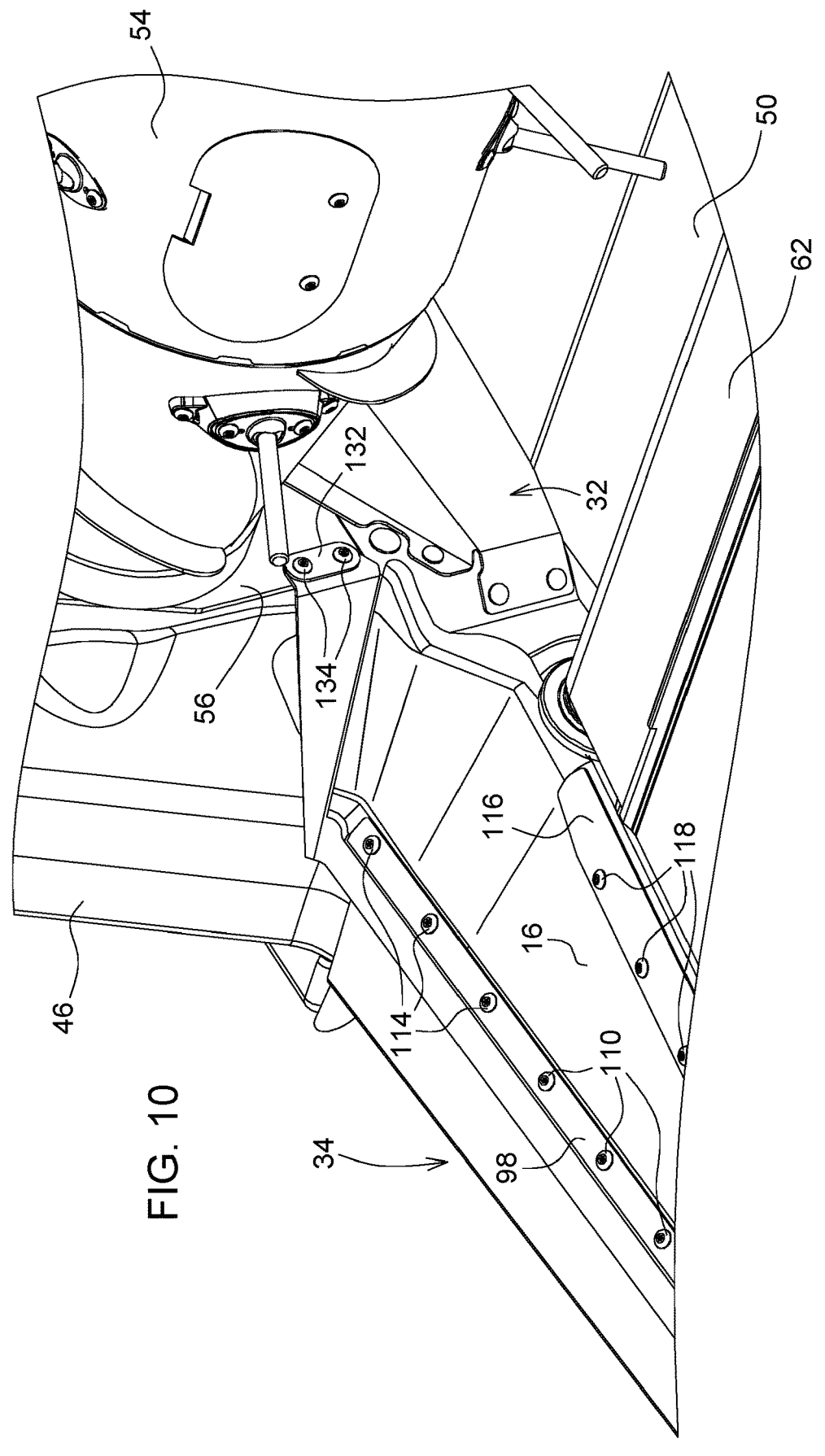
FIG. 10 is a front perspective view showing mounting of a rear portion of the first flexible seal to a feed frame of the center support frame.

Referring to FIGS. 4, 5, and 7, the center main frame 34 includes a first (right) and a second (left) fore-aft side member 70, a laterally-extending front member 72, and a first (right) and second (left) corner 74. The first fore-aft side member 70 is coupled fixedly (e.g., welded) to, and projects forwardly from, the first upright side member 46 of the center main frame 34. The second fore-aft side member 70 is coupled fixedly (e.g., welded) to, and projects forwardly from, the second upright side member 46 of the center main frame 34. The fore-aft side members 70 extend under the respective side draper belt 80. The first corner 74 interconnects the first fore-aft side member 70 and the front member 72, and the second corner 74 interconnects the second fore-aft side member 70 and the front member 72. The cutter bar 18 is coupled to the front member 72 and to the side frames 78.

Referring to FIGS. 6-9, the center main frame 34 is coupled to the center tension frame 52 for movement relative thereto. The center main frame 34 is coupled to the center tension frame 52 with a puck-and-clevis joint 76 on either side of the center tension frame 52. The first fore-aft side member 70 of the center main frame 34 is coupled to the first fore-aft side member 64 of the center tension frame 52 via a puck-and-clevis joint 76, and the second fore-aft side member 70 of the center main frame 34 is coupled to the second fore-aft side member 64 of the center tension frame 52 with a puck-and-clevis joint 76. With respect to each joint 76, the puck may be fixed to the fore-aft side member 70 of the center main frame 34, and the clevis may be fixed to the fore-aft side member 64 of the center tension frame 52. The center main frame 34 can thus move relative to the center tension frame 52 in response to terrain-following as modified by cylinders 48. The joints 76 permit fore-aft and lateral movement of the center main frame 34 relative to the center tension frame 52 of the center support frame 32. In other embodiments, the joints 76 could be configured in other ways, such as, for example, as a pin in a slot.

Referring to FIGS. 1-3, each side section 30 has a side frame 78 and a side conveyor 26 supported by the side frame 78. The side conveyor 26 includes an endless side draper belt 80 supported by the side frame 78. The side draper belt 80 is positioned behind the cutter bar 18 relative to the direction of travel 14 to receive cut crop therefrom and is arranged to advance cut crop laterally relative to the direction of travel 14 to the center section 24. The center draper belt 62 is positioned in register with the side draper belt 80 to receive cut crop laterally therefrom and advance cut crop rearwardly toward the harvester 12 opposite to the direction of travel 14. Each of the center draper belt 62 and side draper belts 80 may include texture elements (not shown) on its surface between adjacent cleats (shown) to hinder fore-aft movement of crop material on the surface.

The side conveyor 26 includes a number of rollers supported by the side frame 78 and spaced laterally apart from one another and about which the side draper belt 34 is entrained. The rollers include a proximal roller, a distal roller, and a number of rollers therebetween. The proximal roller is positioned adjacent to the center section 24 and is the laterally innermost roller of the rollers of the side conveyor 32. The distal roller is the laterally outermost roller of the rollers of the side conveyor 32. A motor of the side conveyor 32 drives the proximal roller in rotation to circulate the side draper belt 34 in a closed-loop path about the rollers of the side conveyor 32.

Referring to FIG. 3, the side frame 78 may be coupled to the center main frame 34 in a wide variety of ways. Illustratively, the side frame 78 is coupled to the center main frame 34 with a set of links. The set includes an upper link 84 and a lower link 86. Each of the upper and lower links 84, 86 is coupled pivotally to the side frame 78 and the center main frame 34. The set includes a first support link 88, a second support link 90, and a hydraulic cylinder 92. The first support link 88 is coupled pivotally to the side frame 78 and an axle. The second support link 90 is coupled pivotally to the center main frame 34 and the axle. The hydraulic cylinder 92 is coupled pivotally to the axle and the side frame 78, such that operation of the hydraulic cylinder 92 pivots the side section 30 and the side frame 78 thereof relative to the center main frame 34. The side frame 78 is further coupled to the center main frame 34 at a front pivot point 95 (FIG. 5).

Referring to FIGS. 4-10, the header 10 includes an inter-frame first (right) and second (left) flexible seal 16. Each inter-frame flexible seal 16 is coupled to the center main frame 34 and the center support frame 32. The first seal 16 is positioned on a first (right) side of the center tension frame 52 so as to span a gap 96 between a first (right) side of the center main frame 34 and the first side of the center tension frame 52. The second seal 16 is positioned on a second (left) side of the center tension frame 52 so as to span a gap 96 between a second (left) side of the center main frame 34 and the second side of the center tension frame 52. The first seal 16 underlies the side draper belt 80 of the first side conveyor 26 to receive cut crop that falls from that side draper belt 80 (indicated by arrow 82 in FIG. 8) and is arranged relative to the center draper belt 62 to guide fallen crop toward the center draper belt 62 (indicated by arrow 83 in FIG. 5). The second seal 16 underlies the side draper belt 80 of the second side conveyor 26 to receive cut crop that falls from that side draper belt 80 (similar to first seal 16 in FIG. 8) and is arranged relative to the center draper belt 62 to guide fallen crop toward the center draper belt 62 (indicated by arrow 83 in FIG. 5). Each seal 16 is configured to flex to accommodate movement of the center main frame 34 relative to the center support frame 32, and may be made, for example, of an elastomeric material (e.g., butyl rubber). The following discussion of the first seal 16 applies similarly to the second seal 16.

The seal 16 is coupled to a fore-aft side member 46 of the center main frame 34 and a fore-aft side member 64 of the center tension frame 52. The seal 16 closes the gap 96 between the fore-aft side member 70 of the center main frame 34 and the fore-aft side member 64 of the center tension frame 52. The seal 16 closes the gap 96 during movement of the center main frame 34 relative to the center tension frame 52.

A mounting plate 98 and a set of fasteners 110 cooperate to fasten the seal 16 to the fore-aft side member 70 of the center main frame 34 with the seal 16 positioned between the mounting plate 98 and the fore-aft side member 70. The seal 16 is coupled to a laterally-sloping ledge 111 of the fore-aft side member 70 with the fasteners 110.

A backing plate 112 and a set of fasteners 114 cooperate with the mounting plate 98 to fasten the seal 16 to the backing plate 112. The seal 16 is positioned between the mounting plate 98 and the backing plate 112.

A mounting plate 116 and a set of fasteners 118 cooperate to fasten the seal 16 to the fore-aft side member 64 of the center tension frame 52 with the seal 16 positioned between the mounting plate 116 and the fore-aft side member 64. The seal 16 is coupled to a ledge 120 of the fore-aft side member 64 with the fasteners 118.

The seal 16 wraps around a corner 74 of the center main frame 34 so as to extend at least partially in front of the center support frame 32. The seal 16 extends at least in front of the center tension frame 52. The seal 16 is coupled to the corner 74. A mounting plate 122 and a set of fasteners 124 cooperate to fasten the seal 16 to the corner 74 with the seal 16 positioned between the mounting plate 122 and the corner 74.

The seal 16 continues to wrap around from the corner 74 back to the center support frame 32. A tang 126 of the seal 16 extends from the corner 74 to a front frame portion 128 of the center tension frame 52. A fastener 130 fastens the tang 126 to the front frame portion 128.

Illustratively, the front frame portion 128, the clevis of the puck-and-clevis joint 76, and the puck of the puck-and-clevis joint 68 are integrated into a single piece (e.g., casting). The single piece includes an eye extending from the upper plate of the clevis of the joint 76. The post of the respective tensioner 66 is coupled to the eye by a pin-and-clevis joint. The single piece includes an extension portion included in the fore-aft side member 64 of the center tension frame 52 and comprising an aperture through which the arm of the tensioner 66 extends. In other embodiments, the single piece may be constructed as multiple pieces.

The seal 16 is coupled to the feed frame 50. A mounting plate 132 and a set of fasteners 134 cooperate to fasten the seal 16 to a side wall 56 of the feed frame 50 with the seal 16 positioned between the mounting plate 132 and the side wall 56.

The seal 16 is arranged to guide cut crop that falls onto it toward the center draper belt 62. Cut crop may fall onto the seal 16 from the side draper belt 62. The seal 16 declines as it extends forwardly in the direction of travel 14 and laterally inwardly transverse to the direction of travel 14 so as to guide cut crop fallen onto it toward the center draper belt 62. The orientation of the seal 16 may change during use of the header 10, such as during operation on uneven or sloping terrain. The seal 16 overlies the puck-and-clevis joint 76 and the spring and post of the tensioner 66, blocking or otherwise minimizing cut crop from falling onto those components and potentially collecting on them.

The seal 16 may thus be coupled to the center main frame 34 and the center tension frame 52. As such, the seal 16 spans and closes the gap 96, during use and non-use of the header 10. During use, as the center main frame 34 moves relative to the center tension frame 52 due, for example, to following of the terrain, the seal 16 maintains closure of the gap 96 to guide cut crop that may fall onto it toward the center draper belt 62.

The fasteners 110, 114, 118, 124, and 130 may be configured as any suitable fastener. For example, they may be configured as a bolt and a nut threaded onto the bolt (threads are generally not shown for ease of illustration but are to be understood, including threads of fasteners 110, 114, 118, 124, and 130).

In another embodiment, a second agricultural header is provided for use with the agricultural harvester 12. The second agricultural header is configured to cut crop when the agricultural harvester 12 moves in the direction of travel 14. The second agricultural header includes a flexible cutter bar (with a reciprocating knife), two endless side draper belts, and an endless center draper belt positioned between the side draper belts. The draper belts are positioned behind the cutter bar relative to the direction of travel 14 to receive crop cut by the cutter bar and gathered by a reel of the header. The side draper belts advance cut crop laterally toward the center draper belt. The center draper belt is positioned to receive cut crop directly from the cutter bar. The center draper belt is also positioned in register with the side draper belts to receive cut crop laterally therefrom and advance cut crop rearwardly toward the harvester 12 for processing thereby.

The second agricultural header includes a header main frame 35 (FIG. 2), a center draper frame, and a plurality of fore-aft float arms 33 (FIG. 2) positioned on either side of the center draper frame. The center draper frame is coupled pivotally to the header main frame 35 and coupled to the cutter bar. A rear portion of the center draper frame is coupled pivotally to the header main frame 35, and a front portion of the center draper frame is coupled to the cutter bar. The center draper belt is supported by the center draper frame. One or more rollers (e.g., front idler roller and rear drive roller) may be coupled to the center draper frame, with the center draper belt entrained about the rollers. The center draper frame is an example of a first frame of the second agricultural header.

Each float arm 33 is coupled pivotally to the header main frame 35 and coupled to the cutter bar such that the float arm 33 is movable relative to the center draper frame. A rear portion of the float arm 33 is coupled pivotally to the head main frame (e.g., about a single axis or possibly via a four-bar linkage), and a front portion of the float arm 33 is coupled to the cutter bar. A skid plate is coupled to the bottom of the float arm 33 for engagement with the ground. Changes in terrain can cause the float arm 33 to pivot relative to the header main frame 35 and relative to the center draper frame and can cause the portion of the cutter bar to which the float arm 33 is coupled to move up and down correspondingly.

Each side draper belt is supported by a plurality of rollers on the respective side of the center draper belt. The rollers are coupled rotatably to the header main frame 35 and the cutter bar. Each float arm 33 thus supports the respective side draper belt, with the float arm extending under the side draper belt. Pivotable movement of a float arm 33 relative to the header main frame 35 will cause corresponding movement of the side draper belt via the cutter bar and respective roller(s). With respect to each side draper belt, the laterally innermost roller may be the drive roller for that side draper belt.

The second agricultural header includes an inter-frame flexible seal on either side of the center draper frame. The first (right) flexible seal is coupled (e.g., fastened) to the center draper frame and the float arm 33 immediately adjacent to the center draper frame on a first (right) side thereof. The second (left) flexible seal is coupled (e.g., fastened) to the center draper frame and the float arm 33 immediately adjacent to the center draper frame on a second (left) side thereof. Each of such immediately adjacent float arms 33 is an example of a second frame of the second agricultural header. Each flexible seal underlies the respective side draper belt to receive cut crop that falls from the side draper belt and is arranged relative to the center draper belt to guide fallen crop toward the center draper belt. Each flexible seal is configured to flex to accommodate movement of the float arm 33 to which it is coupled relative to the center draper frame.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. An agricultural header for use with an agricultural harvester, the agricultural header configured to cut crop when the agricultural harvester moves in a direction of travel, the agricultural header comprising:

a side frame, an endless side draper belt supported by the side frame and positioned to receive crop cut by the agricultural header and advance cut crop laterally relative to the direction of travel, a center main frame to which the side frame is coupled, a center support frame, an endless center draper belt supported by the center support frame and positioned in register with the side draper belt to receive cut crop laterally therefrom and advance cut crop rearwardly toward the agricultural harvester opposite to the direction of travel, the center main frame coupled to the center support frame for movement relative thereto, and an inter-frame flexible seal fastened to the center main frame and fastened to the center support frame on opposing lateral sides of a gap that laterally inwardly extends from the center main frame to the center support frame, the flexible seal coupled to, and configured to laterally wrap around, an intersection of a fore-aft side member and a laterally-extending front member of the center main frame, the flexible seal underlying the side draper belt to receive cut crop that falls from the side draper belt and arranged relative to the center draper belt to guide fallen crop toward the center draper belt, wherein the flexible seal is configured to flex to accommodate movement of the center main frame relative to the center support frame.

2. The agricultural header of claim 1, wherein the flexible seal is fastened to a fore-aft side member of the center main frame and fastened to a fore-aft side member of the center support frame.

3. The agricultural header of claim 2, comprising a mounting plate and a set of fasteners cooperating with the mounting plate to fasten the flexible seal to the fore-aft side member of the center main frame with the flexible seal positioned between the mounting plate and the fore-aft side member of the center main frame.

4. The agricultural header of claim 3, wherein the flexible seal is coupled to a laterally-sloping ledge of the fore-aft side member of the center main frame.

5. The agricultural header of claim 3, comprising a backing plate and another set of fasteners cooperating with the mounting plate to fasten the flexible seal to the backing plate with the flexible seal positioned between the mounting plate and the backing plate.

6. The agricultural header of claim 2, comprising a mounting plate and a set of fasteners cooperating with the mounting plate to fasten the flexible seal to the fore-aft side member of the center support frame with the flexible seal positioned between the mounting plate and the fore-aft side member of the center support frame, the fore-aft side member of the center support frame positioned laterally inwardly of the fore-aft side member of the center main frame.

7. The agricultural header of claim 6, wherein the flexible seal is fastened to a ledge of the fore-aft side member of the center support frame.

8. The agricultural header of claim 1, comprising a mounting plate and a set of fasteners cooperating with the mounting plate to fasten the flexible seal to the corner with the flexible seal positioned between the mounting plate and the corner.

9. The agricultural header of claim 2, wherein the flexible seal closes a gap between the fore-aft side member of the center main frame and the fore-aft side member of the center support frame.

10. The agricultural header of claim 1, wherein the flexible seal wraps in a lateral direction around a corner of the center main frame so as to extend at least partially in front of the center support frame.

11. The agricultural header of claim 1, wherein the flexible seal declines as the flexible seal extends forwardly and laterally inwardly.

12. The agricultural header of claim 1, comprising a joint, wherein the center main frame is coupled to the center support frame with the joint, and the flexible seal overlies the joint.

13. The agricultural header of claim 1, wherein the flexible seal is made of an elastomeric material.

14. An agricultural header for use with an agricultural harvester, the agricultural header configured to cut crop when the agricultural harvester moves in a direction of travel, the agricultural header comprising:

a header main frame, a cutter bar, a center draper frame coupled pivotally to the header main frame and coupled to the cutter bar, a float arm coupled pivotally to the header main frame and coupled to the cutter bar such that the float arm is movable relative to the center draper frame, an endless side draper belt supported by the float arm and positioned to receive crop cut by the agricultural header and advance cut crop laterally relative to the direction of travel, the float arm extending under the side draper belt, an endless center draper belt supported by the center draper frame and positioned in register with the side draper belt to receive cut crop laterally therefrom and advance cut crop rearwardly toward the agricultural harvester opposite to the direction of travel, and an inter-frame flexible seal fastened to the float arm and fastened to the center draper frame on opposing lateral sides of a gap that laterally inwardly extends from the float arm to the center support frame, the flexible seal underlying the side draper belt to receive cut crop that falls from the side draper belt and arranged relative to the center draper belt to guide fallen crop toward the center draper belt, wherein the flexible seal is configured to flex to accommodate movement of the float arm relative to the center draper frame, wherein the seal wraps around a corner of the center draper frame.

15. The agricultural header of claim 14, wherein the flexible seal is fastened to a fore-aft side member of the float arm and to a fore-aft side member of the center draper frame.

16. An agricultural header for use with an agricultural harvester, the agricultural header configured to cut crop when the agricultural harvester moves in a direction of travel, the agricultural header comprising:

a first frame, a second frame, the first frame coupled for movement relative to the second frame, an endless side draper belt positioned to receive crop cut by the agricultural header and advance cut crop laterally relative to the direction of travel, the first frame extending under the side draper belt, an endless center draper belt supported by the second frame and positioned in register with the side draper belt to receive cut crop laterally therefrom and advance cut crop rearwardly toward the agricultural harvester opposite to the direction of travel, and an inter-frame flexible seal fastened to a fore-aft side member of the first frame and fastened to a fore-aft side member of the second frame on opposing lateral sides of a gap that laterally inwardly extends from the first frame to a center support frame, the flexible seal underlying the side draper belt to receive cut crop that falls from the side draper belt and arranged relative to the center draper belt to guide fallen crop toward the center draper belt, wherein the flexible seal is configured to flex to accommodate movement of the first frame relative to the second frame, and wherein the flexible seal is coupled to, and configured to laterally wrap around, an intersection of a fore-aft side member and a laterally-extending front member of the first frame.

17. The agricultural header of claim 16, comprising a cutter bar, wherein the first frame is coupled to the cutter bar.

18. The agricultural header of claim 16, comprising a header main frame and a cutter bar, wherein the first frame comprises a float arm coupled pivotally to the header main frame and coupled to the cutter bar, and the second frame comprises a center draper frame coupled pivotally to the header main frame and coupled to the cutter bar, and the flexible seal is coupled to the float arm and the center draper frame.

19. The agricultural header of claim 16, comprising a side frame, wherein the first frame comprises a center main frame to which the side frame is coupled, the second frame comprises a center draper frame, the side draper belt is supported by the side frame and by the center main frame through the side frame being coupled to the center main frame, the center draper belt is supported by the center draper frame, the center main frame is coupled to the center support frame for movement relative thereto, the flexible seal is coupled to the center main frame and the center support frame, and the flexible seal is configured to flex to accommodate movement of the center main frame relative to the center draper frame.

\* \* \* \* \*